Nov. 17, 1964     J. A. RUTH     3,157,466
PROCESS FOR PRODUCING AMMONIUM NITRATE
Filed Nov. 21, 1958     7 Sheets-Sheet 1

FIG. 1

INVENTOR.
JOHN A. RUTH
BY
ATTORNEYS

INVENTOR.
JOHN A. RUTH
ATTORNEYS

Nov. 17, 1964  J. A. RUTH  3,157,466
PROCESS FOR PRODUCING AMMONIUM NITRATE
Filed Nov. 21, 1958                                7 Sheets-Sheet 5

INVENTOR.
JOHN A. RUTH
BY
ATTORNEYS

Nov. 17, 1964  J. A. RUTH  3,157,466
PROCESS FOR PRODUCING AMMONIUM NITRATE
Filed Nov. 21, 1958  7 Sheets-Sheet 6

INVENTOR.
JOHN A. RUTH
BY
ATTORNEYS

Nov. 17, 1964   J. A. RUTH   3,157,466
PROCESS FOR PRODUCING AMMONIUM NITRATE
Filed Nov. 21, 1958   7 Sheets-Sheet 7

*INVENTOR.*
JOHN A. RUTH
BY
ATTORNEYS

United States Patent Office 3,157,466
Patented Nov. 17, 1964

3,157,466
PROCESS FOR PRODUCING AMMONIUM
NITRATE
John A. Ruth, Carterville, Ill., assignor, by mesne assignments, to Commercial Solvents Corporation, a corporation of Maryland
Filed Nov. 21, 1958, Ser. No. 775,411
9 Claims. (Cl. 23—103)

This invention relates to ammonium nitrate and particularly to an improved method of manufacturing ammonium nitrate.

Ammonium nitrate is widely used for industrial purposes particularly as a major component in various types of blasting explosives and fertilizers. The ammonium nitrate can be used alone but is generally mixed with a variety of materials to enhance its properties. When used as an explosive, ammonium nitrate is treated with sensitizer such as nitroglycols and the like, carbon, petroleum products, as well as with other types of fuels. As a fertilizer, ammonium nitrate is a ready source of available nitrogen but in actual use is generally mixed with other inorganic compounds to provide a source of phosphorus, potassium and other desirable components. In addition, ammonium nitrate can be treated with various waterproofing and anti-setting agents to retard or inhibit its tendency to change crystalline structure and form a solid cake.

Ammonium nitrate is commercially made by reacting ammonia and nitric acid followed by concentration of the resultant solution to yield a solid product. Commercially, ammonium nitrate is available as a granular product or as prills. The prills, or solidified droplets of ammonium nitrate, are prepared by subdividing a stream of ammonium nitrate into droplets and solidifying the droplets in free fall. Since ammonia is most readily available in liquid form, it is generally preferred to utilize this material as a source of one of the reactants. However, this presents a formidable problem because the ammonia must be in the gaseous state before it is reacted with nitric acid. One other problem confronting the industry is the control of the acidity of the ammonia-nitric acid reaction chamber. Although this can be controlled theoretically by proportioning the amounts of the reactants, as a practical matter, the acidity and thus the yield of the reaction varies over a relatively wide range. This acidity control is also of great importance in the subsequent concentration operations primarily because any excess nitric acid in the final product has an adverse effect on the stability and physical properties of the ammonium nitrate. One other operating difficulty confronting the industry is the necessity of an exceedingly tall prilling tower. In general, these towers are over 100 feet tall and in most cases between about 130 and 150 feet in height.

It is therefore an object of this invention to provide an improved process for the manufacture of ammonium nitrate. Another object of this invention is to provide an efficient process for manufacturing ammonium nitrate that overcomes the disadvantages of the prior art processes. A more specific object of this invention is to provide a novel process for the manufacture of ammonium nitrate from ammonia and nitric acid in which the acidity and other operating conditions are maintained within relatively narrow ranges so as to obtain an improved product in a more efficient manner.

Other objects and advantages will be evident from the following description and the accompanying drawing in which.

In accordance with this invention, generally speaking, these and other objects are accomplished by reacting aqueous nitric acid with gaseous ammonia in a neutralizer which is maintained within a predetermined alkalinity range by recycling the gaseous effluent from the neutralizer, then concentrating the resultant ammonium nitrate solution in multi-stage evaporators to obtain substantially anhydrous ammonium nitrate and subsequently prilling or graining the molten ammonium nitrate substantially devoid of water. In carrying out this invention, the ammonia and aqueous nitric acid are delivered in constant streams to the neutralizer in which ammonium nitrate is formed. These reactants are introduced into the neutralizer in such proportions to maintain the neutralizer on the alkaline side and generally between pH 8 and pH 9. It is exceedingly difficult to insure that the pH will consistently be within the above range. This is particularly true since one of the reactants, ammonia, is in the gaseous form and a portion of it escapes before being contacted with the nitric acid. Thus, if some means aside from proportioning the reactants were not provided, the neutralizer would undoubtedly be close to or on the acid side which would result in a lower yield and softer prills of lower stability. To avoid this contingency, the gaseous and vaporous effluent from the neutralizer is passed into a scrubber in which it is reacted with additional aqueous nitric acid and converted to aqueous ammonium nitrate which is returned to the neutralizer.

One of the raw materials utilized in carrying out the present invention is liquid ammonia. Before this material can conveniently be neutralized with nitric acid, it must be converted into the gaseous state. This is done by passing the liquid ammonia into a heat exchanger which can be located at the bottom of the prilling tower or in any other convenient position. In this way, heat is absorbed by the ammonia, transforming it into a gas and at the same time air is cooled to provide a ready and economical source of coolant for the prilled product.

After the reaction between the ammonia and nitric acid is complete, an aqueous ammonium nitrate solution containing between about 80% and 85% ammonium nitrate is obtained from the neutralizer. This solution, which has a melting point between about 150° F. and 170° F. is transferred from the neutralizer to a heated storage tank from whence it is carried to a series of multiple phase evaporators to remove substantially all of the water therefrom. Preferably, the solution is passed through two banks of falling film evaporators in series. In the first bank of evaporators, it is preferred to concentrate the solution to about 96–97% ammonium nitrate, and in the second bank of evaporators to remove substantially all of the water so as to provide molten ammonium nitrate containing a maximum of about 0.5% water. While two banks of evaporators are preferred, it will be readily understood that this is not critical and that any desired number of evaporators can be utilized.

In evaporating the water from the ammonium nitrate solution, its pH is carefully controlled to maintain the yield and to insure the formation of a suitable product. The solution leaving the neutralizer is slightly alkaline at about pH 8.5. In passing through the first bank of evaporators, a portion of the ammonia is driven off so that the solution becomes slightly acid, preferably about pH 6.0. To increase the yield of ammonium nitrate, in accordance with this invention, from the acidic solution obtained during the first concentration, controlled amounts of ammonia are added to the second effect evaporators. In this way, the product from the second stage evaporators is substantially neutral ammonium nitrate having a pH of about 7.0.

The resultant substantially anhydrous molten ammonium nitrate is then passed through the prilling tower headers under a head of approximately 30 inches of ammonium nitrate to insure the formation of uniformly sized prills. This substantially pure ammonium nitrate is formed into droplets after leaving the headers at the top of the prilling tower and solidify in free fall through the tower. The air throughout the entire height of the prilling tower is comparatively cool relative to the molten ammonium nitrate throughout the column. It has been found that when the ammonium nitrate being introduced into the prilling tower has a water content not in excess of about 0.5% that the height of the prilling tower can be very greatly reduced. Thus, in accordance with the present invention, a substantially spherical product is obtained with a prilling tower having a height of fall in the range of about 35 to 70 feet whereas conventional ammonium nitrate prilling operations utilizing about 95% ammonium nitrate solutions require prilling towers having heights normally about 180 to 225 feet.

Although the above discussion indicates that all of the ammonium nitrate made in accordance with this invention is to be prilled, it is to be specifically understood that it can also be grained. When a grained product is desired, the ammonium nitrate solution from the neutralizer is blended with substantially anhydrous molten ammonium nitrate from the second effect evaporators and the blend is then grained and screened.

The invention will be more fully understood by reference to the following specific example of a preferred embodiment thereof taken in connection with the appended drawing. Unless otherwise specified, all proportions and compositions in this embodiment and throughout the specification are given in parts by weight.

Figure 1:
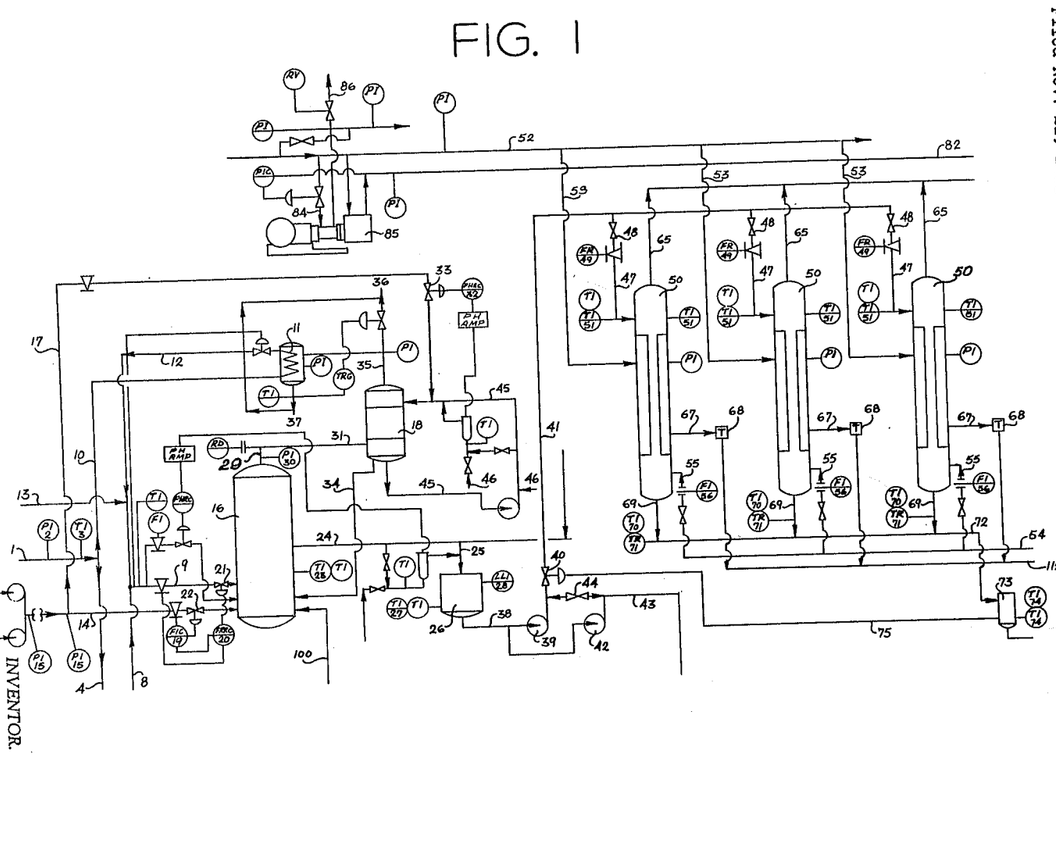
FIGURE 1 is a schematic flow diagram illustrating the neutralization and preliminary evaporation steps of the present invention.

In accordance with this embodiment as particularly shown in FIGURE 1, liquid ammonia from a hortonsphere or other suitable reservoir is introduced through line 1 which is provided with a pressure indicator designated as PI2 as well as a temperature indicator designated as TI3. The major portion of the ammonia then passes through line 4 to a heat exchanger 5 in the base of the prill tower 6. In the heat exchanger, the liquid ammonia is transformed into a gas by heat exchange contact with a supply of air indicated at 7 which cools the prilled product. The gaseous ammonia then returns through lines 8 and 9. In addition, a portion of the liquid ammonia from line 1 is diverted through line 10 into vaporizer 11 in which it is vaporized and returned through line 12 to be combined with the gaseous ammonia in line 9. In some instances, it has also been found desirable to introduce additional gaseous ammonia. Line 13 is provided for this purpose. A solution of 58% nitric acid is introduced through line 14 which is provided with pressure indicators PI15 into the neutralizer 16. A portion of the nitric acid flow can be diverted through line 17 to the steam scrubber 18 whose operation will be discussed later. The flow of nitric acid and gaseous ammonia into the neutralizer 16 is controlled by flow indicator 19 and flow ratio recorder controller 20 which operate control valves 21 and 22. The ammonia and nitric acid, upon entering the neutralizer 16 which is at a temperature of approximately 130° C. react to form aqueous ammonium nitrate. About 22,400 parts of 58% nitric acid is added to the reactor for about each 2,540 parts of ammonia to maintain the neutralizer at about pH 8.5. The temperature of the neutralizer is readily determined by temperature indicator TI23. The reaction product is an aqueous solution of ammonium nitrate having a concentration of about 83%. This solution is transferred from the neutralizer 16 through lines 24 and 25 to storage tank 26 where it is held for subsequent treatment. Storage tank 26 is provided with temperature indicator TI27 and the volume of the solution in the storage tank is indicated by liquid level indicator LLI28.

The gaseous effluent from neutralizer 16 consists essentially of water, gaseous ammonia and some entrained ammonium nitrate. This effluent passes through exhaust 29 which is provided with pressure indicator PI30 and through line 31 into the scrubber 18 wherein the free ammonia is acidified with additional nitric acid so as to yield an acidic aqueous ammonium nitrate solution at about pH 6.5. As indicated above, the nitric acid is introduced into the scrubber 18 through line 17. The flow of the nitric acid into the scrubber 18 is controlled by a pH recording controller PHRC32 which regulates valve 33. When required, water can be added to the system at this point through inlets 46. The hot acidic ammonium nitrate solution from the scrubber 18 is fed back to the neutralizer through line 34. The vaporous effluent from scrubber 18 is exhausted through line 35. The liquid and gaseous components of the effluent are resolved in condenser 11 with the gaseous product being passed to the atmosphere as indicated at 36 and the liquid products, which are predominantly water, are exited as indicated at 37.

The 83% ammonium nitrate solution, having a pH of about 8.5, is collected in storage tank 26 and then further concentrated. This solution is taken from the tank through line 38. That portion of the solution to be ultimately prilled passes through pump 39 and valve 40 into line 41 whereas that portion destined to be grained passes through pump 42 into line 43, the flow through which is controlled by valve 44.

Figure 2:
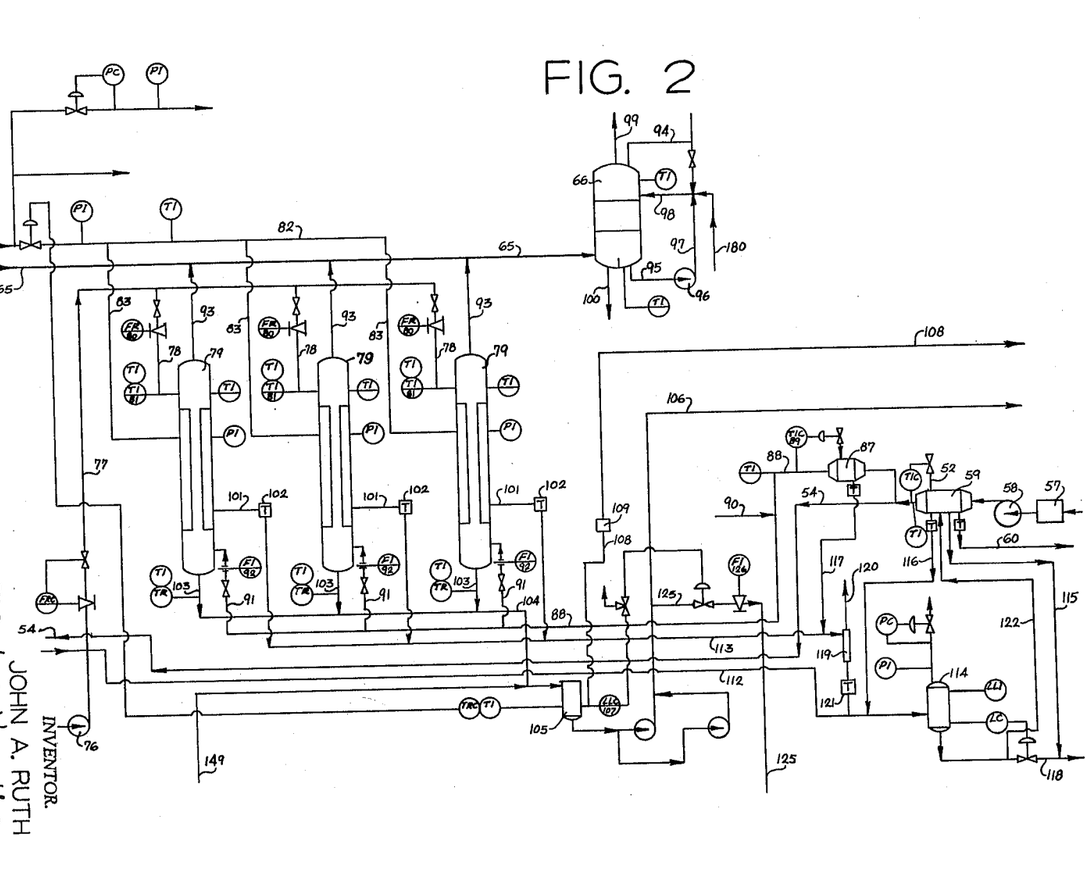
FIGURE 2 is a schematic flow diagram illustrating the secondary evaporation steps and controls associated therewith.

The solution passing through line 41 is divided into three equal portions which flow through lines 47 and valves 48 provided with flow recorders FR49 into evaporators 50. The temperature of the solution entering the evaporators is indicated by temperature indicators TI51. These evaporators are heated by steam at a pressure of 150 p.s.i. which is provided through lines 52 and 53. A stream of hot air is introduced into the base of the evaporators 50 through lines 54 and 55, the latter line being provided with flow indicators 56. As shown in FIGURE 2, atmospheric air is filtered at 57, compressed in blower 58 from which it passes into heater 59 whose source of heat is steam at 150 p.s.i. from steam line 52. The steam exhaust from heater 59 passes through a trap in line 60 to the sewer.

Figure 11:
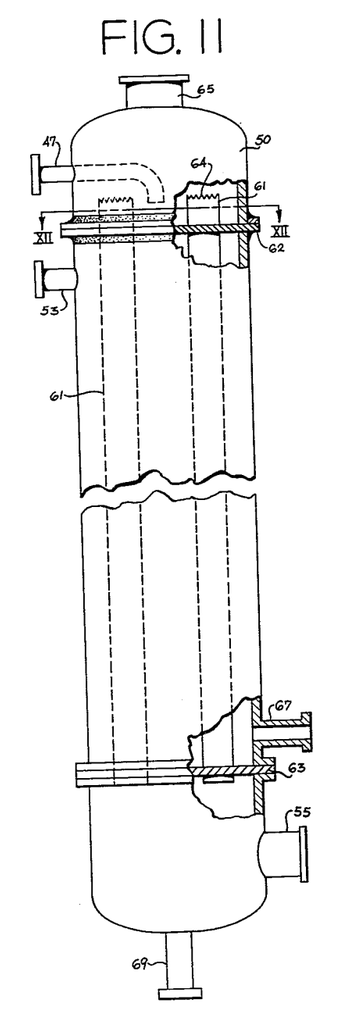
FIGURE 11 is a longitudinal sectional view of the first effect evaporators shown in FIGURE 1.
Figure 12:
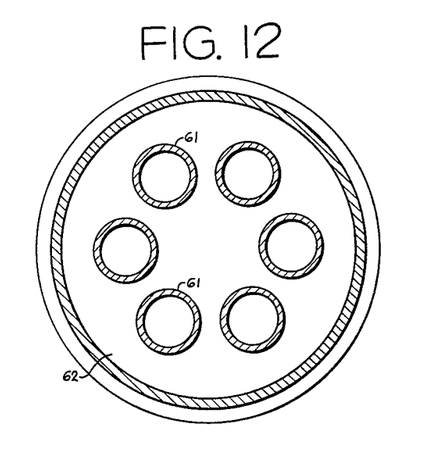
FIGURE 12 is a transverse view taken along the lines XII-XII of FIGURE 11.
Figure 13:
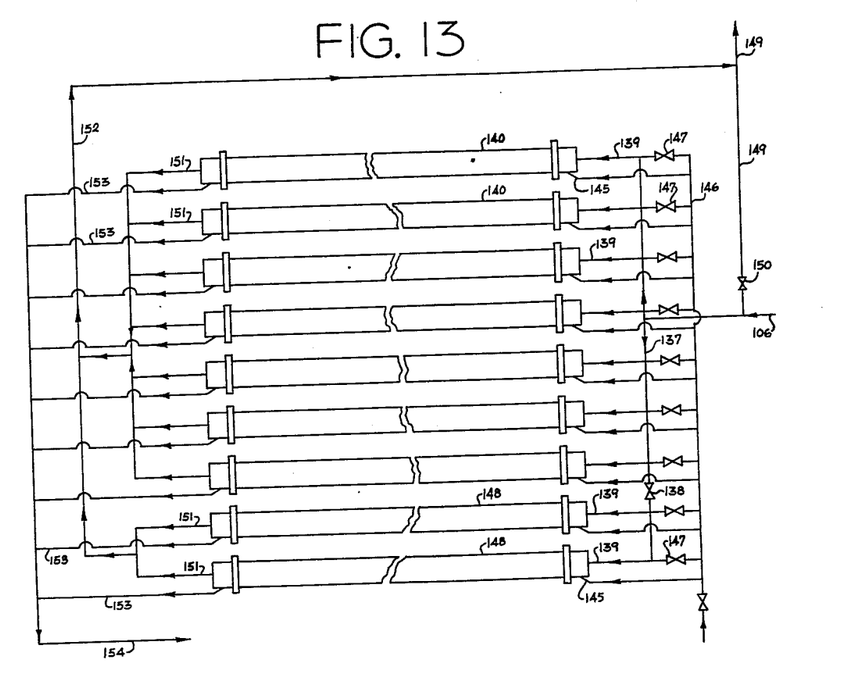
FIGURES 13 and 14 are schematic representations showing the particular arrangement of the headers utilized in the prilling tower.
Figure 14:
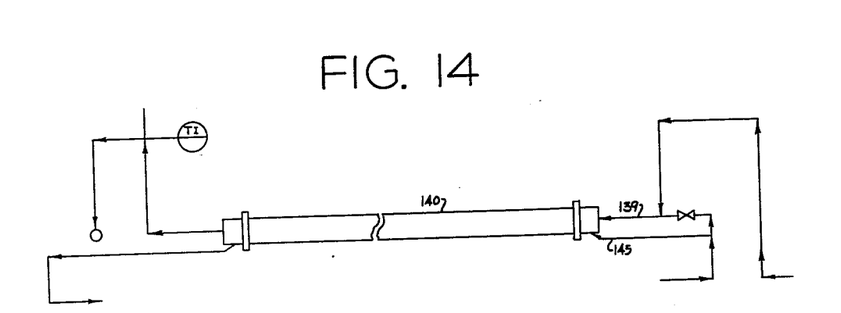

The operation of the evaporators will be explained with particular reference to FIGURES 11 and 12 of the drawing. As shown in FIGURE 11, the ammonium nitrate enters the top of the evaporator 50 and accumulates around that portion of tubes 61 projecting above transverse member 62 which forms a gas-tight fit with the vertical tubes 61. The lower extremity of the tubes 61 are also maintained by a similar transverse member 63. The ammonium nitrate solution then passes over the serrated edges 64 of the tubes and passes down the interior surface of the tubes in the form of a film. The ammonium nitrate solution in the tubes flows counter-current to a stream of air which is maintained at a temperature of about 160° C. This air enters the base of the evaporators through line 55 and exists at the top of the evaporator through line 65 from which it is passed to scrubber 66 shown in FIGURE 2. While the ammonium nitrate solution and air are passing counter-current through tubes 61, these tubes are jacketed by steam which is introduced into the external portion of the evaporator through line 53 and the steam condensate passes out through lines 67, each of which are provided with steam traps 68. A portion of the water in the ammonium nitrate solution is thus removed and the ammonium nitrate solution leaving the evaporators through lines 69, which are provided with temperature indicators TI70 and temperature recorders TR71, has a concentration of about 96% to 97% while its acidity has been increased to about pH 6.0. The temperature of the solution leaving these evaporators is between about 340° F. and 345° F.

Lines 69 from these first effect evaporators feed into line 72 and into surge pot 73, which is provided with temperature indicators TI74. The input of ammonium nitrate solution into the evaporators through line 41 is controlled by a liquid level controller in the surge pot 73. This is indicated generally by the line 75. Thus, when the level in the surge pot indicates that the evaporators 50 may be receiving too much solution, this control shuts off or reduces the flow valve 40.

The resultant ammonium nitrate solution is pumped from the surge pot by pump 76 through line 77 and lines 78 into the second effect evaporators 79. It will be noted that lines 78 are provided with flow recorders 80 and temperature indicators 81. These evaporators are similar in construction and action to the first effect evaporators particularly described hereinbefore in connection with FIGURES 11 and 12, but these evaporators differ from those described above in that they are provided with four internal tubes rather than six. Also, the second effect evaporators are operated at a higher temperature. Thus, the steam surrounding the tubes is at 220 p.s.i. rather than at 150. This steam is introduced into the evaporators 79 through steam lines 82 and 83. By referring to FIGURE 1, it will be noted that this high pressure steam is provided by passing a portion of the 150 p.s.i. steam of line 52 through line 84 and compressor 85, the exhaust steam from the compressor 85 being exhausted through line 86. The steam condensate leaves the second effect evaporator 79 through line 101, each of which is provided with a steam trap 102. In like manner, the air passing counter-current to the ammonium nitrate solution in the second effect evaporators 79 is at a higher temperature than the air utilized in the first effect evaporators 50. To obtain this higher temperature, a portion of the air stream from the air heater 59 is diverted through an auxiliary heater 87 to obtain an air temperature of approximately 172° C. After the air has left this auxiliary heater through line 88, which is provided with temperature indicator control TIC89, gaseous ammonia is introduced into the air line at 90. This air line 88 is divided into three separate lines 91 provided with flow indicators 92. Air lines 91 enter the lower portion of the evaporators in the same manner as previously indicated with respect to the first effect evaporators and the air is exhausted from the top of the evaporators through lines 93, which combine with the air from the first effect evaporators in line 65, and is then passed to the scrubber 66. Water is introduced into scrubber 66 through line 94 and recycled as indicated through line 95, pump 96 and lines 97 and 98. The gaseous effluent from scrubber 66 passes to the atmosphere through line 99 and the recovered solution is introduced into neutralizer 16 through line 100.

The ammonium nitrate leaving the bottom of the second effect evaporators through lines 103 is substantially neutral by virtue of the addition of ammonia to the air before it passes counter-current to the solution and the solution is now substantially anhydrous, having an ammonium nitrate content of approximately 99.5%. This concentrated solution, at a temperature of approximately 172° C. then passes through line 104 to surge pot 105.

This surge pot, in effect, provides a receiver or functions as a supply tank for providing the anhydrous ammonium nitrate through line 106 to the prilling tower 6. The amount of ammonium nitrate flowing through line 106 is controlled by a liquid level controller 107 through pneumatic line 108 and a pneumatic relay 109 which operates valve 110 to throttle the volume of molten ammonium nitrate passing into headers 111. Condensate from line 67 of the first effect evaporators and lines 101 in the second effect evaporators, is collected through lines 112 and 113 in a condensate receiver 114. The condensate receiver 114 also receives the condensate from air heaters 59 and 87 through lines 116 and 117, respectively, wherein upon condensation all of the aforesaid condensates are passed to any suitable disposal means, such as a sewer, through line 118.

However, the condensate passing through line 117 from air heater 87 merges with the condensate in line 113 where, after it is introduced into a suitable regulator 119 to reduce the pressure on the condensate to be providing a suitable source of low pressure steam of about 150 p.s.i. in line 120. This low pressure steam may, if necessary, be employed to supplement the low pressure steam used to heat the first effect evaporators or may be available for any suitable use desired in the plant. The regulator 119 is provided with a suitable trap 121 to pass the condensate from regulator 119 into line 112.

Air heater 59 is also provided with an auxiliary condensate return 115 to supplement the condensate into line 118. Line 118 of condensate receiver 114 is also provided with a steam return line 122 for air heater 59 in order to utilize any live steam present in line 118 to supplement heating in the air heater.

Figure 3:
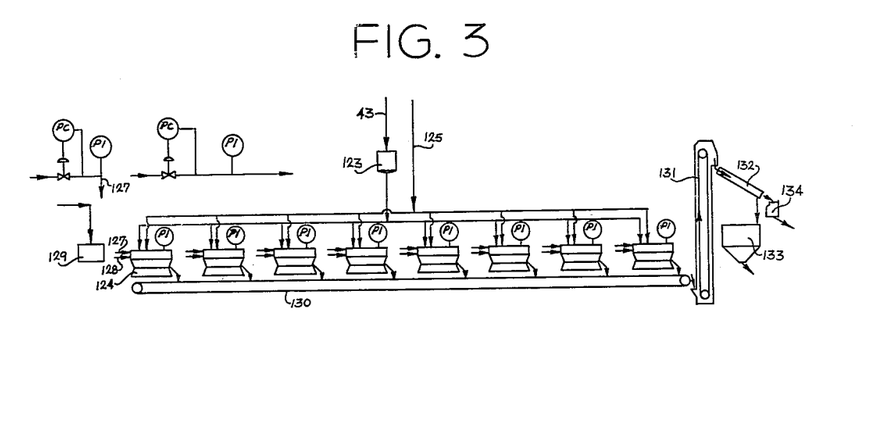
FIGURE 3 is a schematic representation of the graining kettles utilized in accordance with this invention.

In the manufacture of granular ammonium nitrate, the 83% ammonium nitrate solution from the neutralizer 16 passes through line 43 into surge pot 123 and thence into the graining kettles 124. In the graining kettles, the solution is mixed with the 99.5% ammonium nitrate from the second effect evaporators 79. The more concentrated ammonium nitrate solution is introduced into the grainers through line 125 provided with a valve and flow indicator 126 so as to control the amount of ammonium nitrate diverted from the line 106 on the way to the prill tower. The 83% ammonium nitrate solution and the 99.5% ammonium nitrate solution may be blended and mixed in the graining kettles to give a concentration of 97% to 99%. As indicated in FIGURE 3 of the drawing, each of the graining kettles is provided with a steam inlet 127 for 150 p.s.i. steam and also with a water inlet 128. Both of these materials are used to control the temperature of the graining operation and are circulated in a jacket around the periphery of the kettle. The steam is used for heating and when the temperature becomes excessive, the steam can be cut off and water circulated to cool the kettles. If desired, a small amount, say from about 0.5% to 1.5% of paraffin may be added. The paraffin is contained in reservoir 129 and is added to the ammonium nitrate in order to provide the resultant granular ammonium nitrate with a thin coating. The graining kettles are provided with plow-type agitators or scrapers which rotate upon a central shaft and scrape the crystallizing ammonium nitrate solution away from both the side wall and bottom of the graining kettles. In this way, the particle size of the ammonium nitrate is controlled within relatively close limits and a uniform product is insured. When the ammonium nitrate solution has been substantially dehydrated and converted to granular ammonium nitrate, a trap door in the bottom of the kettles is opened and the continued operation of the agitator causes all of the granular ammonium nitrate to be emptied through the bottom of the kettles onto an endless conveyor belt 130. The granular product is then transferred to elevator 131 and through separator 132. The final granular product drops into cooler 133 while the overs pass through hammer mill 134 for reworking.

Figure 4:
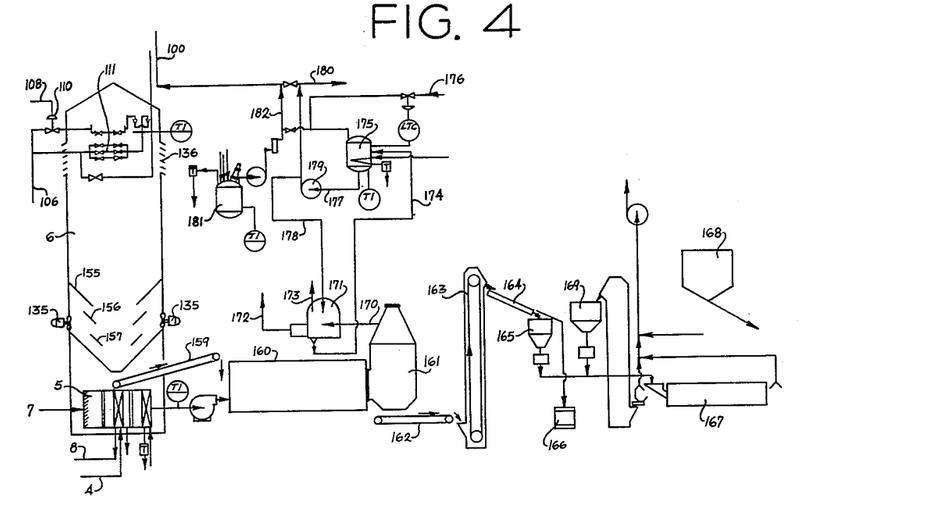
FIGURE 4 is a schematic flow diagram illustrating the prilling and subsequent operation of the present invention.

The prilling operation will now be described in general with regard to FIGURE 4 and in more particularity with reference to FIGURES 8, 9, 10, 13 and 14. Prilling tower 6 may be constructed in any convenient form such as rectangular or cylindrical and as above described. Air for the tower is provided by a plurality of opposed inlet fans 135 and the air is discharged at the upper portion of the tower through louvers 136. Ammonium nitrate for the prill tower is supplied from the second effect evaporators through line 106 into a common header 137 provided with a valve 138 to permit the addition or elimination of supplementary header 148 described below, as so desired. Line 106 is also provided with a branch line 149 normally closed with a valve 150 in order to by-pass the header system if desired. The ammonium nitrate from common header 137 is fed by line 139 into a plurality of jacketed headers 140 generally indicated as 111 in FIGURE 4. All of the headers comprise an inner pipe 141 provided with a plurality of spaced openings or orifices 142 in the bottom for the spraying of ammonium nitrate solution. This pipe is surrounded by larger pipe 143 to provide an annular space 144 for the injection of steam through inlet 145. The ammonium nitrate inlet at each header 140 is additionally connected to a steam header 146 and generally maintained in closed relation thereto by means of valves 147. The purpose of connecting the ammonium nitrate inlets of headers 140 to the steam header 146 is to facilitate cleaning in the event of shut down of the prilling tower. Such cleaning is accomplished after shut down by opening valves 147 to permit high temperature steam to pass through pipe 141 to melt and flush any solidified ammonium nitrate.

Figure 8:
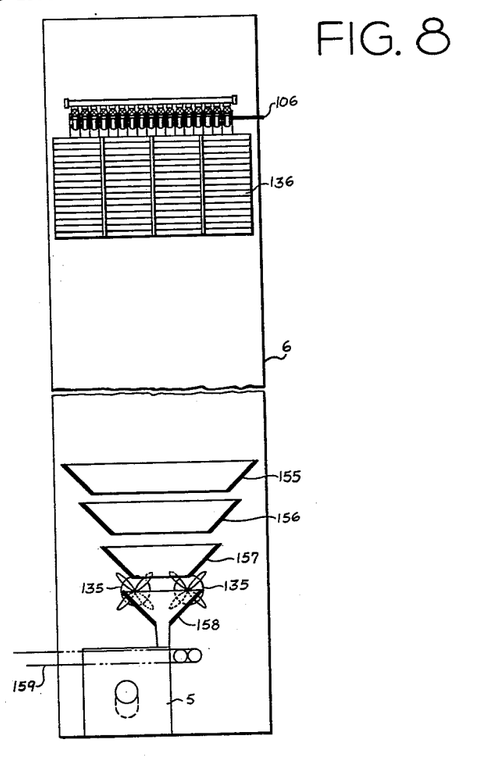
FIGURE 8 is a longitudinal sectional view of the prilling tower utilized in the present process.
Figure 9:
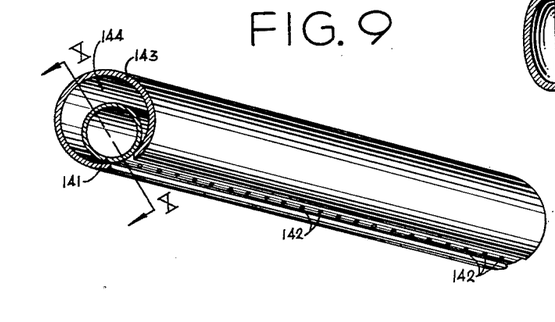
FIGURES 9 and 10 are perspective views partially in cross section of the headers utilized in the prilling tower shown in FIGURE 8.
Figure 10:
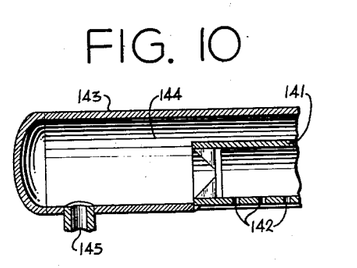

As brought out above, in the header system 111, the ammonium nitrate solution is maintained at a head of 30 inches to provide even and constant distribution of the ammonium nitrate through orifices 142. In order to maintain constant pressure within the header system and to prevent the building up of excessive pressures, pipe 141 in each of the headers 140 or 148 is provided with an outlet 151 which, by appropriate piping, are connected into a common return header 152 for return of unsprayed ammonium nitrate through line 149 to surge pot 105. Condensate of the steam injected into annular space 144 of headers 140 and 148 is returned by line 153 into a common header 154 for disposal by any conventional manner, such as to a sewer.

The droplets of ammonium nitrate are solidified in their free fall downward within the prill tower and are channeled by means of funnels 155, 156, 157 and 158, successively, into an endless conveyor belt 159. The cooled ammonium nitrate droplets or prills on conveyor 159 are transferred to a cooling drum 160 where they are further cooled by the source of air 7 cooled by the vaporization of ammonia in heat exchanger 5. The ammonium nitrate prills are passed through the rotating cooling drum 160 into a cyclone separater 161 and thence to conveyor 162 and into elevator 163. From the elevator, the prills are transported over a size separator 164 with the product falling into container 165 and the overs going into container 166 for reworking. The prills from receptacle 165 are transported to rotating coating drum 167 wherein it is mixed with about 5% kieselguhr. The kieselguhr is maintained in reservoir 168 and transported into the system through hopper 169. The final product is removed from the rotating coating drum 167 and is packaged in any desired manner.

The resultant product consists essentially of substantially spherical ammonium nitrate prills having a packing density of approximately 55 pounds per cubic foot and having a thin coating of kieselguhr adhering to their surfaces. This material is exceedingly uniform in size, free flowing, and particularly well adapted for any ultimate use.

The fines from the cyclone separator 161 are transported through line 170 into dust collector 171 wherein the fines are separated from the air carrying them and the air is exhausted through lines 172 and 173. Within the dust collector 171, the fines are contacted with water or an aqueous solution, and the subsequent solution or slurry is transported through line 174 into dissolving tank 175 together with water from source 176 to effect solution of the ammonium nitrate at this point. A portion of the solution is pumped from the dissolving tank through lines 177 and 178 by means of pump 179 to the dust collector 171. Thus, in effect, an aqueous ammonium nitrate solution is continuously recycled from the dust collector 171 to the dissolving tank 175 so as to effect recovery of the ammonium nitrate fines. The resultant ammonium nitrate solution from the dissolving tank is fed through lines 180 into scrubber 66 shown in FIGURE 4.

The others which have been collected in container 166 are transferred to dissolving tank 181 together with water and steam to facilitate solution. The resultant solution is then pumped through line 182 into line 100 for return to the neutralizer 16.

Figure 5:
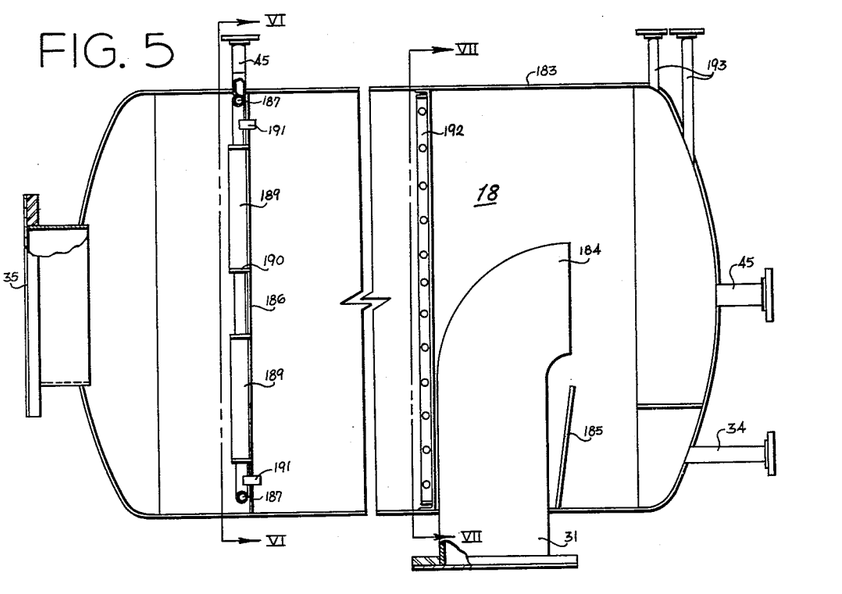
FIGURE 5 is a longitudinal cross section of the steam scrubber utilized in the present process.
Figure 6:
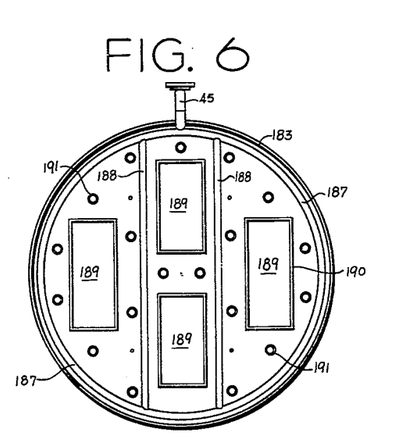
FIGURE 6 is a transverse view taken along the line VI—VI of FIGURE 5.
Figure 7:
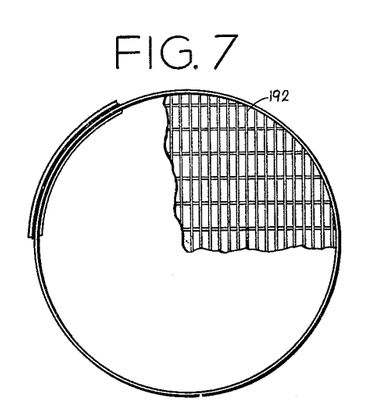
FIGURE 7 is a transverse view taken along the line VII—VII of FIGURE 5.

Scrubber 18 will now be described with particular reference to FIGURES 5, 6 and 7. The various components of this scrubber are formed of any suitable corrosion resistant material such as stainless steel, glass, etc. The scrubber is provided with a generally cylindrical wall 183. The gaseous effluent from the neutralizer 16 enters the lower portion of the scrubber through line 31. It will be noted that after entering the scrubber, this line is deflected downwardly substantially at right angles as shown, for example, at 184, so that the effluent is directed toward the bottom of the scrubber. Slightly below the point of entry of line 31, the scrubber is provided with a splash guard 185. The gaseous effluent entering the scrubber is contacted with an aqueous solution which is introduced through line 45. As previously described, this aqueous solution consists of nitric acid together with a recycled solution of ammonium nitrate contained in the lower portion of the scrubber. Upon entering the scrubber, this aqueous solution is evenly distributed on tray 186 by means of a perforated circular piping 187 and perforated cross piping 188 connected across circular pipe 187. Tray 186 is formed of a circular element connected by suitable bonding across the cross section of scrubber 18. Openings 189 are formed of any suitable configuration such as rectangular, as shown, by suitably striking upwardly directed flanges 190 welded together at appropriate locations to form a continuous flange or rim about opening 189. In like manner, openings 189 may be struck through the tray and appropriate upwardly directed flanges or rims welded about the periphery of the aforesaid opening. The purpose of the flanges or rims 190 is to maintain a level of ammonium nitrate solution on tray 186. This tray 186 is also provided with a plurality of spaced tubular passageways 191. As shown in the drawing, these extend slightly above the level of the tray. Thus, if the acidic ammonium nitrate solution is introduced through line 45, it is distributed over the face of the tray 186 and overflows through members 191 and descends to the bottom of the scrubber where it neutralizes the gaseous effluent from the neutralizer. The scrubber is also provided with a screen 192 which traverses the entire cross-section of the scrubber. This screen is positioned intermediate the entry 31 and the tray 186 to prevent undue surging of the materials being treated in the scrubber. In addition, the screen also further distributes the solution dropping from the tray and serves to expedite mixing of the materials. The scrubber is also provided with two temperature indicating wells 193 and also with two basal openings. The centrally located opening 45 serves as a recycling exit whereas line 34 serves as a return to the neutralizer 16. The gaseous effluent from the scrubber is carried out through outlet 35.

While the above embodiment describes the invention in some detail, it will be readily appreciated that various modifications can be made without departing from the scope and spirit of this invention. Thus, while two sets of three falling film evaporators were described, it is to be understood that different types and numbers of evaporators can be utilized with equal facility. Also, many modifications in the manner of heating and instrumentation will present themselves to those skilled in the art. Furthermore, several features of the invention, particularly the prilling and graining operations, are applicable with appropriate modification to materials other than ammonium nitrate. Such materials include urea, sodium nitrate, potassium nitrate, hydrazine nitrate, and other similar water soluble materials.

From the above it will be understood that the above embodiment is purely illustrative and not limitative except as indicated by the following claims.

What is claimed is:

1. A process for producing ammonium nitrate comprising converting liquid ammonia into gaseous ammonia by passing it in heat exchange relation with a stream of a heated gaseous medium so as to raise the temperature of the ammonia and to form a cooled gaseous medium, reacting said gaseous ammonia with aqueous nitric acid, continuously maintaining the resultant reaction mixture at an alkaline condition within a pH range of about 7.0 to 9.0, removing the gaseous effluent of ammonia, water, and entrained ammonium nitrate from said reaction mixture, scrubbing ammonia from the effluent and acidifying it with nitric acid, continuously adjusting the resultant effluent solution within an approximate pH range of 6.0 to 7.0 by the addition of aqueous nitric acid thereto, returning the adjusted acidified solution to said reaction mixture, continuously withdrawing the resultant ammonium nitrate solution from said reaction mixture at an alkaline pH within the approximate range of 7.0 to 9.0, introducing a portion of said resultant ammonium nitrate solution to a crystallization zone, flowing said ammonium nitrate solution countercurrent to a first stream of hot inert gases, maintaining the rates of flow and temperatures of said streams to concentrate said solution and to effect partial decomposition of said ammonium nitrate in said solution to obtain a 96% to 97% concentrated, slightly acidic solution, introducing gaseous ammonia into a second stream of inert gases, flowing a stream of said concentrated acidic solution countercurrent to said second stream of inert gases containing gaseous ammonia, maintaining the rates of flow and temperatures of said second stream and of said 96% to 97% ammonium nitrate solution to obtain a 99.5% to 100% concentrated, substantially neutral solution, blending a portion of said final concentrated solution with the portion of said resultant ammonium nitrate solution from said reaction mixture in said crystallization zone, crystallizing said blended portions, spraying the remainder of said final concentrated solution into and counter current to said cooled gaseous medium, permitting said spray to fall a sufficient distance to solidify and cool the droplets of said spray, and further cooling said solidified droplets with said cooled gaseous medium.

2. A process for producing ammonium nitrate comprising converting liquid ammonium into a gaseous ammonia by passing it in heat exchange relation with a stream of a heated gaseous medium so as to raise the temperature of the ammonia and to form a cooled gaseous medium, reacting said gaseous ammonia with aqueous nitric acid, continuously maintaining the reaction mixture at a pH of about 8.5, removing the gaseous effluent of ammonia, water, and entrained ammonium nitrate from said reaction mixture, scrubbing the ammonia from the effluent and acidifying it with nitric acid, continuously adjusting the acidifying effluent solution to an approximate pH of 6.5 by the addition of aqueous nitric acid thereto, returning the adjusted acidified solution to said reaction mixture, continuously withdrawing the resultant ammonium nitrate solution from said reaction mixture at a pH of 8.5 and a concentration of 83%, flowing a hot stream of said ammonium nitrate solution countercurent to a stream of hot inert gases, maintaining the rates of flow and temperatures of said streams to concentrate said solution and to effect partial decomposition of said ammonium nitrate in said solution to obtain a 96% concentrated solution having a pH of about 6.0, introducing gaseous ammonia into a second stream of inert gases, flowing a stream of said concentrated ammonium nitrate solution countercurrent to said second stream of inert gases containing gaseous ammonia, maintaining the rates of flow and temperatures of said second stream of inert gas and of said concentrated ammonium nitrate solution to obtain at least a 99.5% concentrated solution at a pH of about 7.0, spraying said 99.5% concentrated solution into and countercurrent to said cooled gaseous medium, permitting said spray to fall a sufficient distance to solidify and cool the droplets of said spray, and further cooling said solidified droplets with said cooled gaseous medium.

3. A process for producing ammonium nitrate comprising converting liquid ammonium into a gaseous ammonia by passing it in heat exchange relation with a stream of a heated gaseous medium so as to raise the temperature of the ammonia and to provide a cooled gaseous medium, reacting said gaseous ammonia with aqueous nitric acid, continuously maintaining the reaction mixture within a pH range of about 7.0 to 9.0, removing the gaseous effluent of ammonia, water, and entrained ammonium nitrate from said reaction mixture, scrubbing and acidifying the ammonia from the effluent with nitric acid, continuously adding sufficient aqueous nitric acid to the effluent solution to maintain a pH range of about 5.0 to 7.0, returning the adjusted acidified solution to said reaction mixture, continuously withdrawing the resultant ammonium nitrate solution from said reaction mixture at a pH between about 7.0 to 9.0, flowing a hot stream of said ammonium nitrate solution countercurrent to a stream of hot inert gases, maintaining the rates of flow and temperatures of said streams to concentrate said solution and to effect partial decomposition of said ammonium nitrate in said solution to obtain a 96% to 97% concentrated, slightly acid solution, introducing gaseous ammonia into a second stream of inert gases, flowing a stream of said concentrated ammonium nitrate solution countercurrent to said second stream of inert gases containing gaseous ammonia, maintaining the rate of flow and temperatures of said second stream and of said concentrated ammonium nitrate to obtain a 99.5% to 100% concentrated, substantially neutral solution, spraying said final concentrated solution at a temperature of 350° F. to 365° F. into and countercurrent to said cooled gaseous medium cooled by said heat exchange relation, permitting said spray to fall a sufficient distance to solidify and cool the droplets of said spray, and further cooling said solidified droplets with a second gaseous cooling medium.

4. The process for preparing molten $NH_4NO_3$ which comprises contacting in countercurrent heat exchange relationship an aqueous alkaline $NH_4NO_3$ solution with a hot inert gas, said aqueous $NH_4NO_3$ solution containing initially between about 80 and about 85 percent by weight of $NH_4NO_3$, said contacting being for a sufficient length of time, at a sufficient rate and at a sufficient temperature to evaporate sufficient water from the $NH_4NO_3$ solution to yield a solution containing between about 96 and about 97 percent by weight of $NH_4NO_3$ and to reduce the pH of the initial solution to slightly acidic, contacting the resulting $NH_4NO_3$ solution with a gaseous mixture of a hot inert gas and $NH_3$ in countercurrent heat exchange relationship for a sufficient length of time at a sufficient rate and at a sufficient temperature to yield molten $NH_4NO_3$ having a pH substantially neutral and an $NH_4NO_3$ concentration of at least about 99.5 percent by weight.

5. The process of claim 1 wherein the temperature of the remainder of said final concentrated solution prior to spraying is between about 350° F. and about 365° F.

6. The process for producing ammonium nitrate which comprises continuously reacting in a reaction zone gaseous ammonia and aqueous nitric acid to yield an aqueous solution of ammonium nitrate and a gaseous effluent of ammonia, water and entrained ammonium nitrate, continuously withdrawing said effluent from said reaction zone, continuously reacting the withdrawn effluent with sufficient aqueous nitric acid solution to form an aqueous ammonium nitrate solution having a pH of about 5 to 7, continuously adding the resulting acidic ammonium nitrate solution with said gaseous ammonia and said aqueous nitric acid to said reaction zone at a rate to maintain the pH of the resulting ammonium nitrate solution at between about 7 and about 9, continuously withdrawing from said reaction zone a portion of the aqueous ammonium nitrate solution having a pH between about 7 and about 9 and a concentration of between about 80 and 85 percent by weight of $NH_4NO_3$, contacting said aqueous ammonium nitrate solution in countercurent heat exchange relationship with a hot inert gas, said contacting being for a sufficient length of time, at a sufficient rate and at a sufficient temperature to evaporate sufficient water from the ammonium nitrate solution to yield a solution containing between about 96 and about 97 percent by weight of ammonium nitrate and to reduce the pH of the initial solution to slightly acidic, contacting the resulting ammonium nitrate solution with a gaseous mixture of a hot inert gas and ammonia in countercurrent heat exchange relationship for a sufficient length of time at a sufficient rate and at a sufficient temperature to yield molten ammonium nitrate having a pH substantially neutral and an ammonium nitrate concentration of at least about 99.5 percent by weight.

7. In a continuous process for producing ammonium nitrate by reacting gaseous ammonia with an aqueous nitric acid solution, the steps comprising converting liquid ammonia into gaseous ammonia by passing it in heat exchange relation with a stream of heated gaseous heat transfer medium having a temperature greater than the temperature of the liquid ammonia to raise the temperature of the ammonia and to form cooled gaseous heat exchange medium, reacting the resulting gaseous ammonia with an aqueous nitric acid solution to form an aqueous alkaline ammonium nitrate solution containing initially between about 80 and about 85% by weight of ammonium nitrate, contacting said aqueous alkaline $NH_4NO_3$ solution in countercurrent heat exchange relationship with a hot inert gas for a sufficient length of time, at a sufficient rate and at a sufficient temperature to evaporate sufficient water from the ammonium nitrate solution to yield a solution containing between about 96 and about 97 percent by weight of ammonium nitrate and to reduce the pH of the initial solution to slightly acidic, contacting the resulting ammonium nitrate solution with a gaseous mixture of a hot inert gas and ammonia in countercurrent heat exchange relationship for a sufficient length of time at a sufficient rate and at a sufficient temperature to yield molten ammonium nitrate having a pH substantially neutral and an ammonium nitrate concentration of at least about 99.5 percent by weight, passing droplets of the resulting ammonium nitrate having a concentration of 99.5% in countercurrent heat exchange flow with said cooled gaseous heat exchange medium, permitting said droplets to fall a sufficient distance in said cooled gaseous heat exchange medium to effect solidification of the droplets, whereby heated gaseous heat exchange medium is formed from the cooled medium, and contacting the resulting heated gaseous heat exchange medium with additional liquid ammonia.

8. The process of claim 7, wherein said distance is not substantially in excess of 70 feet.

9. The process for the production of ammonium nitrate in granular form having a bulk density of about 55 pounds per cubic foot which comprises contacting in countercurrent heat exchange relationship an aqueous alkaline $NH_4NO_3$ solution with a hot inert gas, said aqueous $NH_4NO_3$ solution containing initially between about 80 and about 85 percent by weight of $NH_4NO_3$, said contacting being for a sufficient length of time, at a sufficient rate and at a sufficient temperature to evaporate sufficient water from the $NH_4NO_3$ and to reduce the pH of the initial solution to slightly acidic, contacting the resulting $NH_4NO_3$ solution with a gaseous mixture of a hot inert gas and $NH_3$ in countercurrent heat exchange relationship for a sufficient length of time at a sufficient rate and at a sufficient temperature to yield molten $NH_4NO_3$ having a pH substantially neutral and an $NH_4NO_3$ concentration of at least about 99.5 percent by weight, and spraying said molten ammonium nitrate into a tower in countercurrent heat exchange flow with a cooled gaseous medium whereby the ammonium nitrate is solidified in the form of substantially anhydrous individual granules.

References Cited in the file of this patent

UNITED STATES PATENTS

| | | |
|---|---|---|
| 1,613,334 | Symmes | Jan. 4, 1927 |
| 2,399,987 | Cordie et al. | May 7, 1946 |
| 2,402,192 | Williams et al. | June 18, 1946 |
| 2,551,569 | Strelzoff | May 1, 1951 |
| 2,568,901 | Stengel | Sept. 25, 1951 |
| 2,619,405 | Greer et al. | Nov. 25, 1952 |
| 2,723,183 | Dorsey | Nov. 8, 1955 |
| 2,739,036 | Kamenjar et al. | Mar. 20, 1956 |
| 2,739,037 | Stengel et al. | Mar. 20, 1956 |
| 2,884,999 | Lubin et al. | May 5, 1959 |
| 2,934,412 | Stengel | Apr. 26, 1960 |